United States Patent [19]

Rubenfeld

[11] Patent Number: 4,618,061
[45] Date of Patent: Oct. 21, 1986

[54] DEVICE FOR PROTECTION OF DIGITAL DATA

[75] Inventor: Viktor P. Rubenfeld, Manhattan Beach, Calif.

[73] Assignee: SEQUENCE, Santa Monica, Calif.

[21] Appl. No.: 660,115

[22] Filed: Oct. 12, 1984

[51] Int. Cl.$^4$ ............................................. B65D 85/30
[52] U.S. Cl. ................................. 206/444; 206/312
[58] Field of Search .............................. 206/444, 312

[56] References Cited

U.S. PATENT DOCUMENTS 4,411,360 10/1983 Gardineer, Jr. et al. ............ 206/444
4,473,153 9/1984 Colangelo ............................ 206/444

Primary Examiner—Joseph Man-Fu Moy

[57] ABSTRACT

A device allowing improved means for protection of magnetic data storage media from over-writing or erasure includes an envelope of such size so as to allow a tight fit of such envelope over the subject storage media and to allow the magnetic data storage media with the protective envelope to slide easily into a device used for reading or writing information from or to the storage media. When the user desires to write information to the storage media, the envelope is removed from the storage media in order to uncover the "write protect notch" on the storage media. If the user desires to protect the storage media against possible erasure or over-writing, the envelope is placed on the storage media so as to cover the write protect notch.

10 Claims, 4 Drawing Figures

DEVICE FOR PROTECTION OF DIGITAL DATA

BACKGROUND OF THE INVENTION

This invention relates in general to magnetic storage media and in particular to protection of information stored on such media against alternation.

The need to protect electronically stored data against erasure is critical. Current permanent magnetic storage media such as floppy disks are capable of storing from 90,000 to 1,000,000 charactes on a single disk. Information inadvertently erased from a disk is often costly or impossible to recreate or replace.

A floppy disk comprises a flat circular plastic web coated with a surface able to retain a magnetic pattern. The disk is protected from dust and other contaminants by square, flat plastic containers. These containers have one or more notches in their edges which are utilized to indicate the desired protection (read/write) status of the magnetic disk.

Electronic and magnetic information storage devices utilize a switch mechanism directed toward the notch to determine whether the notch is covered or uncovered and thus to determine the write/protect status of the floppy disk. At the present time it is customary to cover these notches with a strip of opaque adhesive paper or plastic to indicate a user's desire to protect any information stored on the disk. The attached adhesive strip prevents an actuator lever of the switch mechanism from traversing the notch in the floppy disk container, the resulting state of the switch mechanism serving to signal the data protection status of the information on the disk.

Because the protection of data is so critical, the adhesive strips used to cover the write/protect notch are made to adhere strongly to the edge of the floppy disk. The strong adhesive properties of these strips creates problems, however, when a user desires to add data to a protected floppy disk. Such an addition requires removal (or sometimes application) of the adhesive strip so that the switch of the storage device can be triggered so as to indicate a change in the data protection status of the disk. Because the adhesive strip attaches so strongly to the floppy disk, the strip is often damaged or destroyed during its removal. Furthermore, these adhesive strips are often reused despite their damaged condition because they are of such shape and adhesive quality as to not be readily available. No more than two or three adhesive strips are sold with each floppy disk.

The reuse of damaged adhesive strips can lead to damage to both the floppy disk and the floppy disk drive. Such damage results when a damaged adhesive strip peels off of the floppy disk during the insertion or removal thereof from a disk drive, allowing possible inadvertent erasure of data thought to be protected or causing damage to the disk drive unit itself.

An object of the present invention is to provide an improved data protection device which eliminates the problems inherent in the presently used adhesive strips.

A more particular object of the present invention is to provide such a device which is easily applied and easily removed from a floppy disk container, thereby facilitating the protection of valuable data.

Another particular object of the present invention is to provide such a device capable of being reused many times.

SUMMARY OF THE INVENTION

A data protection assembly or combination in accordance with the present invention functions to prevent unintentional alterations of electronic data on a floppy disk upon insertion thereof into an electronic apparatus including reading elements for detecting the electronic data on the disk and writing elements for altering the data. In accordance with the invention, the assembly comprises, in combination, a holder for containing the floppy disk and for covering a substantial portion of the surface thereof, status coding means on the holder for indicating to the electric apparatus the protection status of the data on the disk, a sensor operatively connected to the electronic apparatus for detecting the state of the status coding means, and status altering means slidably engageable with the holder for changing the state of the status coding means. The status coding means is adapted to assume alternately each of two possible states, one of the states indicating a data protection status of the electronic data on the disk and the other of the states indicating an unprotected status.

The status coding means preferably takes the form of enabling means for indicating to the electronic apparatus that the electronic data on the floppy disk may be altered, the enabling means including a first element on the holder and the sensor means taking the form of a second element mounted to the electronic apparatus and cooperating with the first element. The status altering or data protection means is in this case slidably engageable with the holder for preventing cooperation between the first element and the second element, thereby disabling the electronic apparatus from altering information stored on the floppy disk.

In accordance with a particular feature of the present invention, the status altering or data protection means comprises an envelope into which the holder and the floppy disk are slidably and removably insertable. The envelope is preferably generally rectangular and at least partially sealed along three edges and open along a fourth edge. The holder comprises a generally rectangular envelope, while the first element of the enabling means comprises an opening in the holder envelope. The data protection envelope has sufficiently large dimensions to cover the opening in the holder envelope upon an insertion of the holder envelope and the floppy disk into the data protection envelope.

Pursuant to a specific feature of the present invention, the data protection envelope is removably securable to the holder envelope via a friction fit. This friction fit is achieved in part by controlling the geometries and sizes of the envelopes. The holder envelope is generally rectangular and has a pair of opposed edges spaced at a distance from one another, while the data protection envelope has a length measured along its open edge and a width measured perpendicularly thereto. The length of the data protection envelope is greater than and approximately equal to the distance between the opposed edges of the holder envelope, while the width of the data protection envelope is sufficiently large so that this envelope covers the opening in the holder envelope upon an insertion thereof the data protection envelope.

In accordance with a further specific feature of the present invention, the data protection envelope is provided with a writing surface having a plurality of generally coextensive lines laterally spaced from one another. The lines define spaces on which various contents of a floppy disk may be indicated.

A data protection assembly or combination in accordance with the present invention eliminates the problems inherent in the presently used adhesive strips. The data protection or write/protect envelope eliminates the need for an adhesive as the envelope is attached to a floppy disk by a friction fit in which an entire edge portion of the disk containing envelope, with the write/protect notch or opening, is encased by the data protection envelope.

The use of a data protection device in the form of an envelope at least partially sealed along three edges and open along a fourth edge encourages the protection of valuable data by facilitating the application and removal of the data protection device from a floppy disk.

Furthermore, since the data protection envelopes are not damaged by their removal from the floppy disk, they are less prone to being damaged and, therefore, more readily reusable.

Potential damage to the floppy disk drive will be averted by using a data protection device in accordance with the present invention. Once inside the disk drive, the data protection envelope would be held firmly against the disk and could not dislodged to damage the drive.

DETAILED DESCRIPTION

Figure 1:
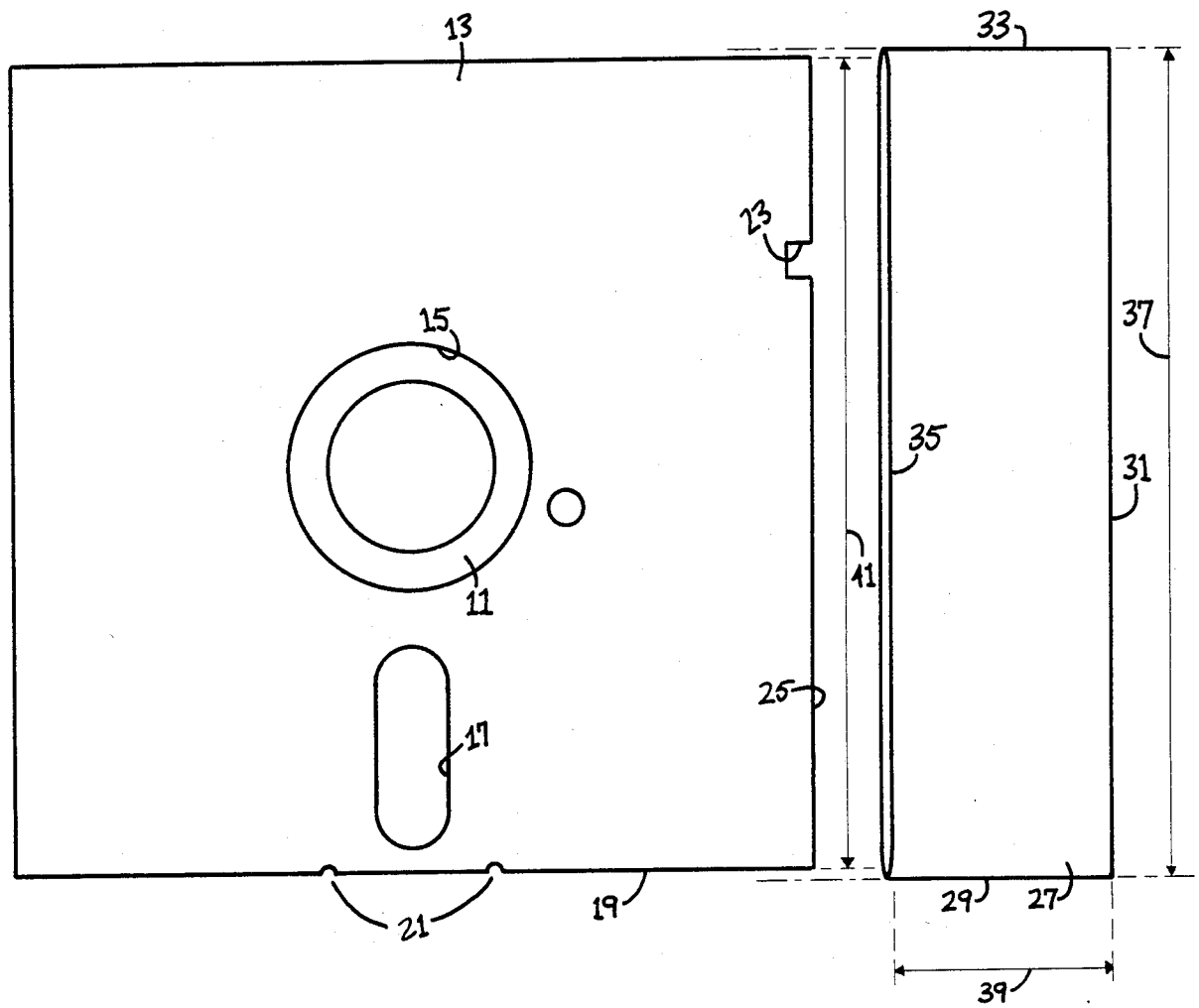
FIG. 1 is a top view of a floppy disk in a holder envelope or container, together with a data protection envelope, in accordance with the present invention.

As illustrated in FIG. 1, a floppy disk 11 is contained in a generally rectangular holder envelope 13 which covers substantially the entire surface of the floppy disk. The holder envelope has a centrally located circular opening 15, whereby the floppy disk may be engaged and rotated within the holder envelope 13 by a disk drive mechanism (not illustrated) in an electronic information storage and retrieval apparatus.

Holder envelope 13 is also provided with an elongate radially extending slot 17 through which a magnetic reading and writing device (not illustrated) in the electronic data storage and retrieval apparatus engages the surface of the floppy disk for detecting and altering data stored on the magnetic surface of the disk. The holder envelope 13 is provided along one edge 19 with a pair of notches 21 which aid in aligning the holder envelope in the disk drive. A further rectangularly shaped notch 23 is provided along an edge 25 of the floppy disk holder envelope 13 extending perpendicularly to edge 19, this notch serving to indicate the desired protection status of the electronic data stored on the floppy disk. In an uncovered state notch 23 customarily indicates that the data on the disk may be altered. To indicate, conversely, that the data is to be preserved upon insertion of the disk into a disk drive, an adhesive strip somewhat larger than notch 23 is applied to holder envelope 13 to cover notch 23. The adhesive strip serves to prevent the electronic information storage and retrievel apparatus from altering data stored on the floppy disk.

Figure 2:
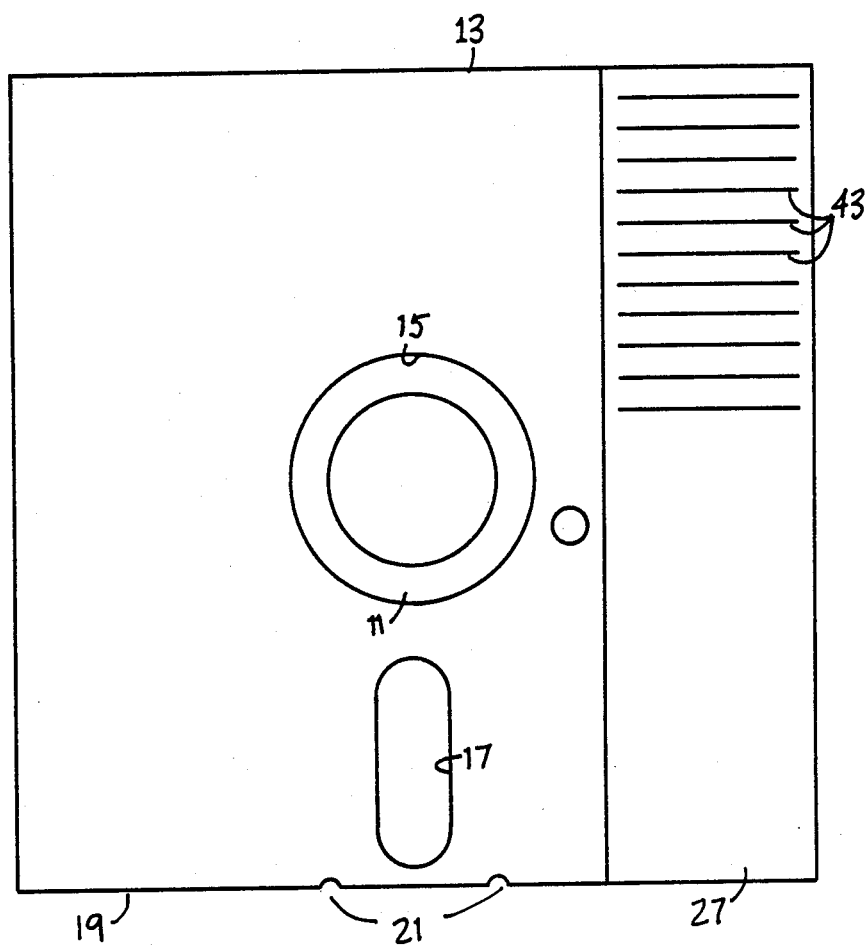
FIG. 2 is a top view similar to FIG. 1, showing the floppy disk and its container envelope inserted into the data protection envelope.

In accordance with the present invention, a data protection device cofunctioning with holder envelope 13 and notch 23 to prevent the unintentional alteration of data stored on a floppy disk comprises a rectangularly shaped envelope 27 at least partially sealed along three edges 29, 31 and 33 and open along a fourth edge 35. Envelope 27 has a length 37 measured parallel to open edge 35 and a width 39 measured perpendicularly thereto. Length 37 of envelope 27 is slightly larger than the length 41 of edge 25, while width 39 is sufficiently great so that envelope 27 covers notch 23 upon an insertion of the floppy disk 11 and holder envelope 13 into data protection envelope 27, as illustrated in FIG. 2. The approximate equality of lengths 37 and 41, together with a sufficiently large width 39 of data protection envelope 27, ensures that envelope 27 will be held on holder envelope 13 by means of a friction fit.

As illustrated in FIG. 2, data protection envelope 27 is advantageously provided with a multiplicity of parallel lines 43 laterally spaced from one another along the length of the data protection envelope. Envelope 27 has an outer surface preferably made of a material which facilitates writing and erasure of pencil, crayon, ink or other marks indicating various contents of a floppy disk.

Figure 3:
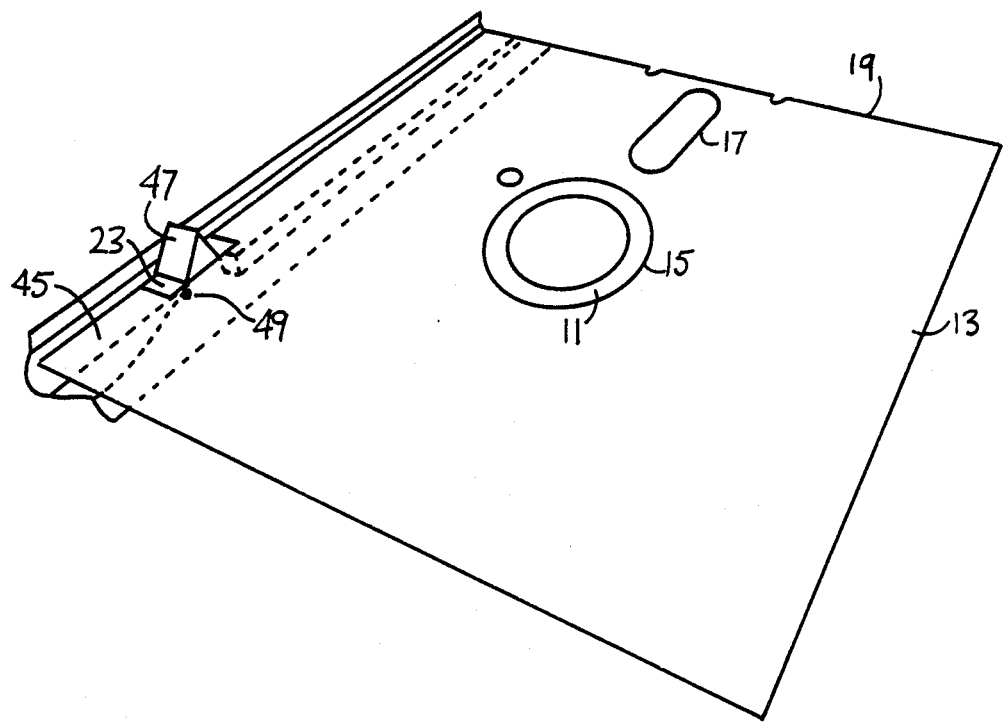
FIG. 3 is a perspective view of the floppy disk and container of FIG. 1, showing a disk drive switch mechanism in an unactuated state.

As illustrated in FIG. 3, an electronic information storage and retrievel apparatus, e.g., in a computer, is provided with a switch mechanism for sensing or detecting whether notch 23 is covered or uncovered. The switch mechanism may include, illustratively, a lever arm 45 extending parallel to edge 25 of holder envelope 13 upon an insertion thereof into the disk drive of the electronic apparatus, lever arm 45 being provided at a free end with a sensor finger 47 extending perpendicularly to lever arm 45 and to floppy disk 11 and holder envelope 13 while these are disposed in the disk drive. When notch 23 is uncovered, as shown in FIG. 3, finger 47 projects through the notch and fails to move lever arm 45 to actuate a microswitch lever or button 49 located proximate to the free end of lever 45.

Figure 4:
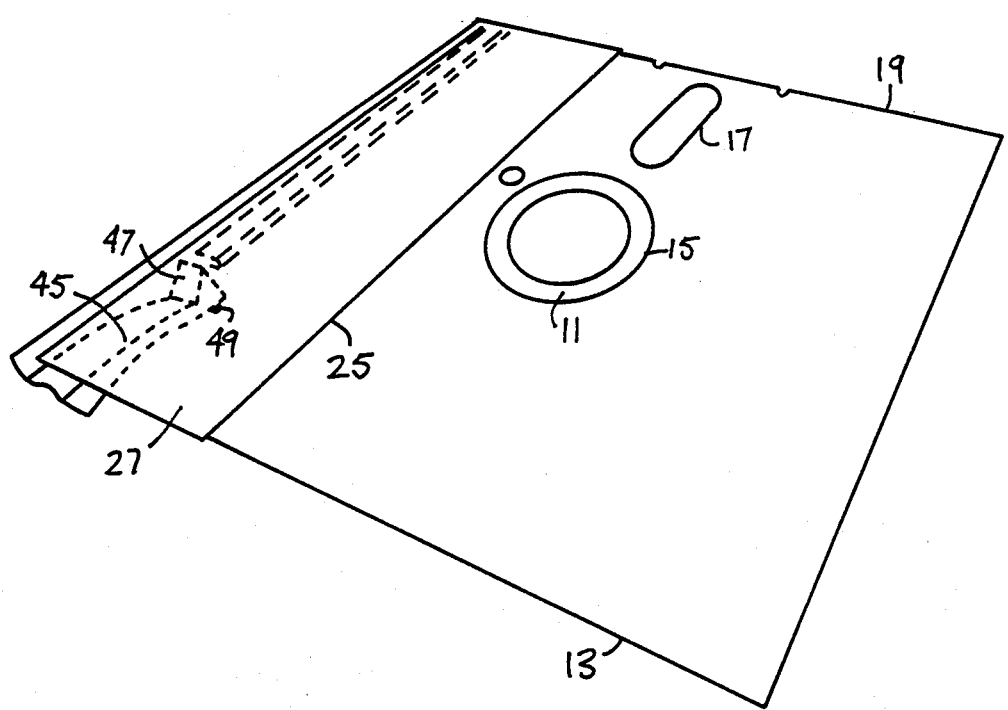
FIG. 4 is a perspective view similar to FIG. 3, showing the data protection envelope on the floppy disk and the switch mechanism in an actuated state.

As illustrated in FIG. 4, when floppy disk 11 and holder envelope 13 are first inserted in data protection envelope 27 and then inserted therewith into a disk drive slot, finger 47 is prevented by envelope 27 from traversing notch 23 in holder envelope 13. Lever arm 45 is consequently pivoted about an end opposite finger 47, whereby microswitch button 49 is actuated by the free end of lever 45. The actuation of microswitch button 49 indicates to the electronic information storage and retrievel apparatus that data stored on disk 13 is not to be altered.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. In a combination for preventing alteration of electronic data stored on a floppy disk, said combination including a generally rectangular envelope containing said floppy disk and covering a substantial portion of the surface thereof, said envelope being provided with an opening traversable by a mechanical switch element in an electronic apparatus upon an insertion thereinto of said envelope and said floppy disk, said combination further including data protection means engageable with said envelope for covering said opening and preventing the traversal thereof by said mechanical switch element upon an insertion of said envelope and said floppy disk into said electronic apparatus, whereby said electronic apparatus is disabled from altering information electronically stored on said floppy disk, the improvement wherein the data protection means comprises an additional envelope into which the generally rectangular envelope with the floppy disk may be slidably inserted, said additional envelope having sufficiently large dimensions to cover the opening in said generally rectangular envelope upon the insertion thereof into said additional envelope, said additional envelope being removably securable to said generally rectangular envelope by a friction fit.

2. The improvement defined in claim 1 wherein said generally rectangular envelope has a pair of opposed edges spaced at a distance from one another, said additional envelope being generally rectangular and at least partially sealed along three edges and open along a fourth edge, said additional envelope having a length measured along said fourth edge and a width measured perpendicularly to said fourth edge, said length being greater than and approximately equal to said distance, said width being sufficiently large so that said additional envelope covers said opening upon an insertion of said generally rectangular envelope and said floppy disk into said additional envelope.

3. The improvement defined in claim 1 wherein said additional envelope is provided with a writing surface having a plurality of generally coextensive, laterally spaced lines thereon.

4. The improvement defined in claim 3 wherein said writing surface is made of a material which facilitates removal of writing particles from said writing surface.

5. An assembly for preventing unintentional alteration of electronic data on a floppy disk upon insertion thereof into an electronic apparatus including reading means for detecting the electronic data and writing means for altering the data, said assembly comprising in combination:
holder means for containing the floppy disk and for covering a substantial portion of the surface thereof;
enabling means for indicating to the electronic apparatus that the electronic data on said floppy disk may be altered, said enabling means including a first element on said holder means and a second element mounted to said electronic apparatus and cooperating with said first element; and
data protection means slidably engageable with said holder means for preventing cooperation between said first element and said second element, thereby disabling said electronic apparatus from altering information stored on said floppy disk.

6. The assembly defined in claim 5 wherein said data protection means comprises an envelope into which said holder means and said floppy disk are slidably and removably insertable.

7. The assembly defined in claim 6 wherein said envelope is a generally rectangular first envelope at least partially sealed along three edges and open along a fourth edge, said holder means comprising a generally rectangular second envelope and said first element comprising an opening in said second envelope, said first envelope having sufficiently large dimensions to cover said opening upon an insertion of said second envelope and said floppy disk into said first envelope.

8. The assembly defined in claim 6 wherein said envelope is provided with a writing surface having a plurality of generally coextensive lines laterally spaced from one another.

9. An assembly for preventing unintenional alteration of electronic data on a floppy disk upon insertion thereof into an electronic apparatus including reading means for detecting the data and writing means for altering the data, said assembly comprising in combination:
holder means for containing the floppy disk and for covering a substantial portion of the surface thereof;
status coding means on said holder means for indicating to the electronic apparatus the protection status of the data on the disk, said status coding means being adapted to assume alternately each of two possible states, one of said states indicating a protected status of the electronic data on the disk, the other of said states indicating an unprotected status;
sensor means operatively connected to said electronic apparatus for detecting the state of said status coding means; and
status altering means slidably engageable with said holder means for changing the state of said status coding means.

10. The assembly defined in claim 9 wherein said status altering means comprises an envelope into which said holder means and said floppy disk are slidably and removably insertable.

* * * * *